US011118897B2

(12) United States Patent
Kay

(10) Patent No.: US 11,118,897 B2
(45) Date of Patent: Sep. 14, 2021

(54) PARTIAL COHERENCE RANGE SENSOR PEN CONNECTED TO THE SOURCE/DETECTOR BY A POLARIZING FIBER

(71) Applicant: QUALITY VISION INTERNATIONAL INC., Rochester, NY (US)

(72) Inventor: David B. Kay, Rochester, NY (US)

(73) Assignee: Quality Vision International Inc., Rochester, NY (US)

( * ) Notice: Subject to any disclaimer, the term of this patent is extended or adjusted under 35 U.S.C. 154(b) by 45 days.

(21) Appl. No.: 16/774,246

(22) Filed: Jan. 28, 2020

(65) Prior Publication Data

US 2020/0240766 A1    Jul. 30, 2020

Related U.S. Application Data

(60) Provisional application No. 62/797,670, filed on Jan. 28, 2019.

(51) Int. Cl.
*G01B 11/00* (2006.01)
*G01B 9/02* (2006.01)

(52) U.S. Cl.
CPC .......... *G01B 11/005* (2013.01); *G01B 9/0209* (2013.01); *G01B 9/02011* (2013.01); *G01B 2290/70* (2013.01)

(58) Field of Classification Search
CPC .............. G01B 11/005; G01B 9/02011; G01B 9/02059; G01B 2290/70; G01B 9/0209
See application file for complete search history.

(56) References Cited

U.S. PATENT DOCUMENTS

| | | | |
|---|---|---|---|
| 4,581,730 | A | 4/1986 | Ozeki et al. |
| 5,648,848 | A | 7/1997 | Aiyer |
| 6,501,551 | B1 | 12/2002 | Tearney et al. |
| 7,791,731 | B2 | 9/2010 | Kay |
| 9,091,523 | B2 | 7/2015 | Kay |
| 10,041,816 | B2 | 8/2018 | Simonpietra et al. |
| 2016/0231101 | A1* | 8/2016 | Swanson ............ G01B 9/02004 |
| 2017/0307352 | A1 | 10/2017 | Kay |
| 2018/0299250 | A1 | 10/2018 | Kay |
| 2019/0041193 | A1* | 2/2019 | Meissner ............... G01B 11/14 |
| 2020/0041259 | A1 | 2/2020 | Watanabe et al. |

FOREIGN PATENT DOCUMENTS

JP    2018205301 A    12/2018

OTHER PUBLICATIONS

Japanese Patent Office, International Search Report and Written Opinion from corresponding PCT Application No. PCT/US2020/015366 dated Apr. 7, 2020.

* cited by examiner

*Primary Examiner* — Michael P LaPage
(74) *Attorney, Agent, or Firm* — Jodi A. Reynolds, Esq.; Harter Secrest & Emery LLP

(57) ABSTRACT

A probe for an optical measurement system includes a probe body arranged to be adjustably mounted in a measuring machine for optically measuring a test object. A polarizing fiber optically coupled within the probe body transmits a source beam having an instantaneous or sequentially established bandwidth spanning a range of wavelengths to the probe body and also transmits a measurement beam from the probe body toward a detector. An adjustable beam manipulator is provided for angularly redistributing the reference beam along the reference arm.

18 Claims, 9 Drawing Sheets

Pixel No. (Wavenumber)

Pixel No. (Wavenumber)

PARTIAL COHERENCE RANGE SENSOR PEN CONNECTED TO THE SOURCE/DETECTOR BY A POLARIZING FIBER

TECHNICAL FIELD

In the field of optical metrology, an optical probe of a coordinate measuring machine typically is moved over a test object to acquire point-by-point height measurements of the test object. Optics are often divided between the probe and another part of the machine.

BACKGROUND

Point-by-point measurements of relative optical path length displacements can be made over a range of such optical displacements by measuring rates of interferometric phase variation with wavenumber. For example, a spatially coherent source beam composed of multiple wavelengths, i.e., a low temporally coherent beam, can be divided by a beamsplitter into an object beam that is reflected from the test object and a reference beam that is reflected from a reference reflector. Reflected light from both the test object and the reference reflector is recombined at a beamsplitter into a measurement beam and refocused within a detector such as a spectrometer, which records interference intensities of the different spectral components of the returning measurement beam. Based on the near linear relationship between (a) the rate of change in interference phase with the change in beam frequency, referred to as a modulation frequency, and (b) the optical path length difference between the object and reference beams, the relative optical displacements between different measured points can be ascertained.

Since information is collected on a point-by-point basis, single mode fibers can be used to convey light along portions of the object and reference arms as well as light traveling to and from the light source and the detector. However, bending motions causing stress induced birefringence in the single mode fiber can produce optical path length variations that reduce interference amplitude and measurement accuracy. Fiber optic cables attached to articulated optical probes are susceptible to such disturbances, especially when they use separate transmit and receive fibers.

SUMMARY OF INVENTION

Certain embodiments provide for enhancing interference phase contrast in an optical measurement system having an interferometer probe connected to both a light source and a detector by an external polarizing fiber. According to one approach, a collimated source beam having an instantaneous or sequentially established bandwidth spanning a range of wavelengths is directed to a beamsplitter within the interferometer probe at which the collimated source beam is divided into (a) an object beam that is directed along an object arm through an object objective within the interferometer probe to an object focus on a test object and (b) a reference beam that is directed along a reference arm to a reference reflector within the interferometer probe, the reference beam being angularly redistributed along the reference arm. Both the object beam reflected from the test object and the angularly redistributed reference beam reflected from the reference reflector are recombined at the beamsplitter into a measurement beam. The measurement beam is focused toward an end of a polarizing fiber having an acceptance cone that limits angular distributions of the measurement beam that are accepted for further propagation along the polarizing fiber toward the detector. The angularly redistributing of the reference beam includes adjusting the angular redistributions of the reference beam to limit the reference beam portion of the focused measurement beam that is accepted through the acceptance cone of the polarizing fiber for further propagation toward the detector.

For making the adjustment, respective intensities of the reflected object beam and the reflected reference beam within the measurement beam can be compared and the reference beam portion of the measuring beam that is accepted through the acceptance cone of the polarizing fiber can be limited to more closely balance the intensities of the reflected object beam portion and the reference beam portion of the measurement beam propagating along the polarizing fiber. For example, the comparison can be made by measuring contrast among phase modulations of different wavelengths in the detector. The excluded portion can include contiguous or noncontiguous portions of the reference beam.

At the beamsplitter, the reference beam can be directed along the reference arm through a reference objective within the interferometer probe to a reference focus on the reference reflector. The angularly redistributing of the reference beam may include defocusing the reference beam on the reflector. The reference beam can be defocused by translating the reference reflector with respect to the reference objective along a common optical axis together with an optical path length adjustment to maintain the relative optical path length between the reference arm and the object arm. Alternatively, the reference beam can be angularly redistributed by pivoting the reference reflector about an axis passing through the reference focus.

Preferably, the source beam is transmitted by the same polarizing fiber to the collimating lens for directing the collimated source beam to the beamsplitter within the interferometer probe. Since a preferred multi-wavelength light source due to current technology usually emits invisible light, a second light source can be used to emit visible light that can be seen on the test object. The visible light can be transmitted along the polarizing fiber to the collimating lens, through the beamsplitter, and along the object arm through the object objective to a focus spot on the test object. Thus, the focus position of the object beam can be seen on the test object for purposes of setup and monitoring.

A reference objective can also be mounted within the probe body such that the reference beam propagates along the reference arm through the reference objective to a reference focus proximate the reference reflector. For spatially excluding variable portions of the reference beam from entering the polarizing fiber, the adjustable beam manipulator can be arranged for variously defocusing the reference beam on the reference reflector. For example, the adjustable beam manipulator can include a first linear adjuster for translating the reference reflector with respect to the reference objective along a common optical axis and a second linear adjuster for relatively adjusting relative optical path length between the reference arm and the object arm to compensate for the change in optical path length associated with the translation of the reference reflector. Alternatively, the adjustable beam manipulator can include a tilt actuator or other tilt adjuster for pivoting the reference reflector about an axis passing through the reference focus. Alternatively, the adjuster can block a portion of the reference beam.

Preferably, the polarizing fiber that is optically coupled within the probe body is a single fiber that provides for both transmitting the source beam to the probe body and transmitting the measurement beam from the probe body. The excluded portions of the reference beam can include non-contiguous portions of the reference beam. The relative intensity of the reference beam portion of the measuring beam can be adjusted with respect to the intensity of the object beam portion of the measuring beam, for example, during the initial calibration of the measuring machine based on expected reflectivities of the test objects, during a later recalibration of the measuring machine for the same or other purposes, between measurement of test objects, including between test objects with different expected reflectivities, or during measurement of individual test objects to maintain a desired level of interference contrast within the detector.

BRIEF DESCRIPTION OF THE DRAWING FIGURES

FIG. 1 is a schematic side elevational view of a multi-axis measuring machine with a vertically displaceable slide mechanism.

FIG. 2 is a diagram of an optical measurement system for the measuring machine of FIG. 1 in which object and reference arms of an interferometer are mounted in a probe and connected to both a light source and a detector by an external polarizing fiber with a reference beam manipulator associated with the reference arm for more closely balancing intensities of object and reference beams directed to the detector.

FIGS. 3A and 3B graphically depict two different measurement outputs of the interferometer in which intensity varies as a function of wavenumber at different modulation frequencies associated with different optical path lengths of the object relative to the reference beam.

FIG. 4 graphically depicts a calculated output of a processor for identifying a modulation frequency based on the output of the detector.

Figure 12:
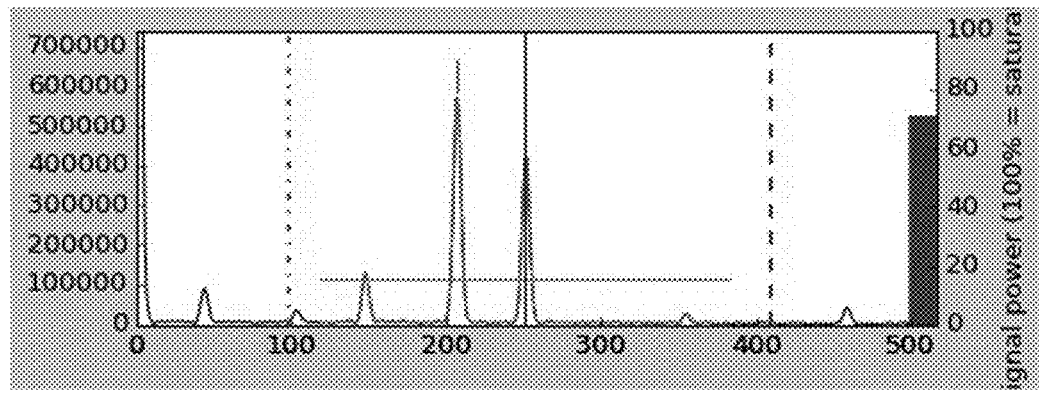

FIG. 12 graphically depicts a calculated output of a processor for identifying a modulation frequency utilizing a "polarization preserving" single mode fiber.

Figure 13:
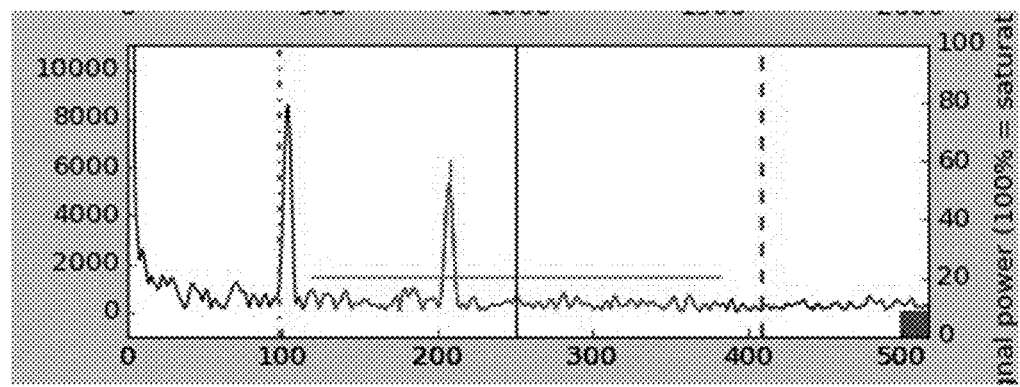

FIG. 13 graphically depicts the modulation frequency of FIG. 12 when object beam is blocked and unable to return to a detector, thereby illustrating the returned reference beam and two fixed delays.

DETAILED DESCRIPTION

Figure 1:
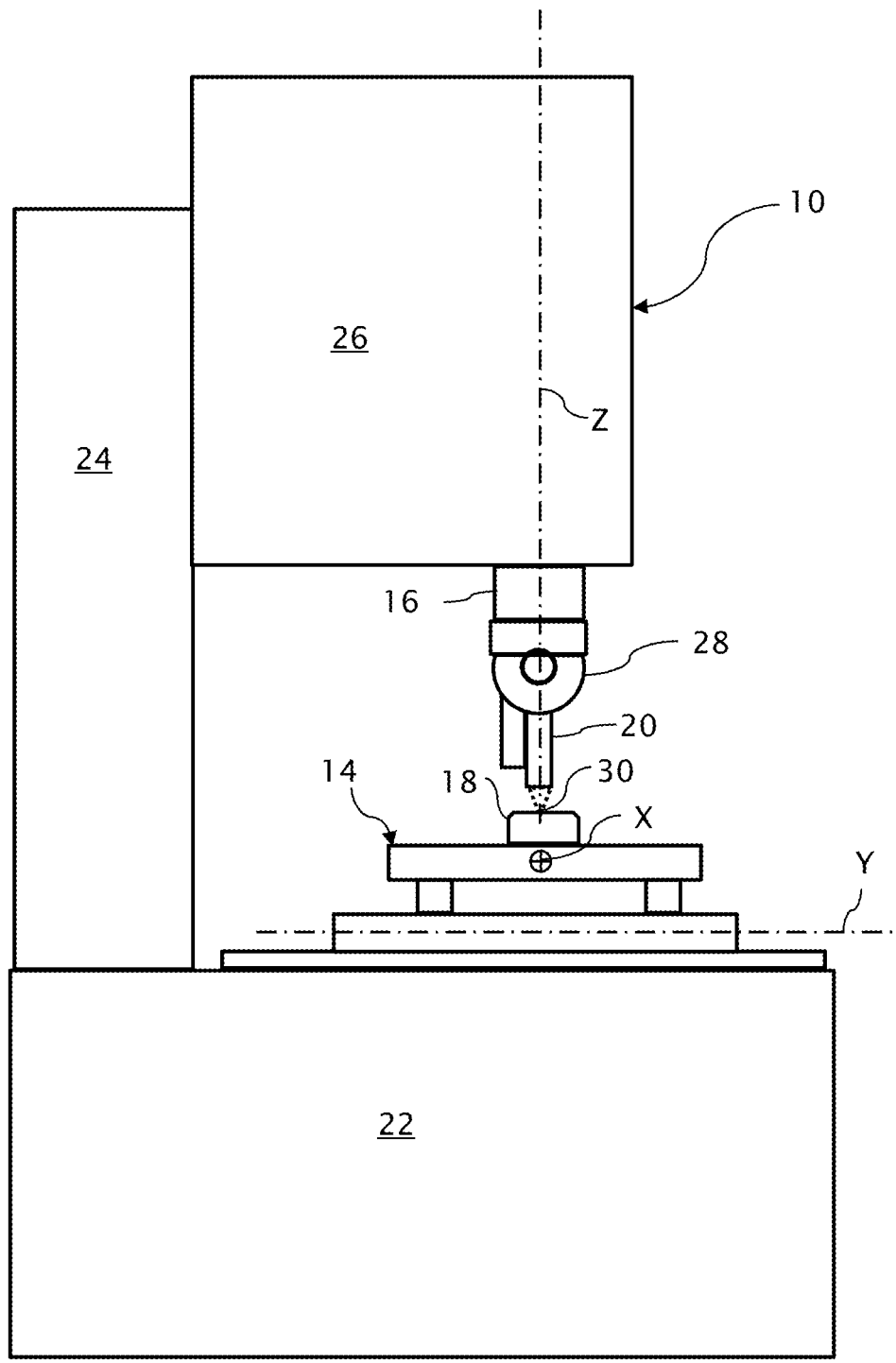

A multi-axis machine 10 depicted in FIG. 1 in one of many possible configurations of an optical measuring machine, includes an x-y stage 14 for horizontally translating a test object 18 along X and Y coordinate axes and a slide mechanism 16 for vertically translating an interferometer probe 20 along a Z coordinate axis. The x-y stage 14 is supported on a machine base 22. The slide mechanism 16 is supported in a slide support 26 carried on a column 24. The interferometer probe 20 is carried on an articulated arm 28 that is both pivotal about a horizontal axis and rotatable together with the pivot axis about the Z coordinate axis, although it could be fixed mounted to the Z coordinate axis. Other unseen portions of the probe optics, including one or more light sources and a detector, or other apparatus supporting the metrology functions of the machine 10 can be housed in the slide support 26 within which the slide mechanism 16 is translatable. Relative motions between the interferometer probe 20 and the test object 18 are measured along or about the various axes to monitor the relative position of the interferometer probe with respect to the test object 18 within a common coordinate system. Besides the interferometric probe 20, a multi-axis machine may also include vision systems and other probes mounted to the Z coordinate axis.

The measuring machine 10 can be arranged with other combinations of rotational and translational axes for relatively moving one or the other of the test object 18 and the interferometer probe 20. Preferably, for gathering information about the test object 18, such as empirical descriptions of test object profiles, the relative motions provide for maintaining an optical focus 30 of light emitted through optical elements of the probe 20 proximate to the test object 18 over a range of different positions on the test object 18 at orientations effective for collecting specular or diffuse reflections of the light from the test object 18 through the same optical elements of the probe 20.

Figure 2:
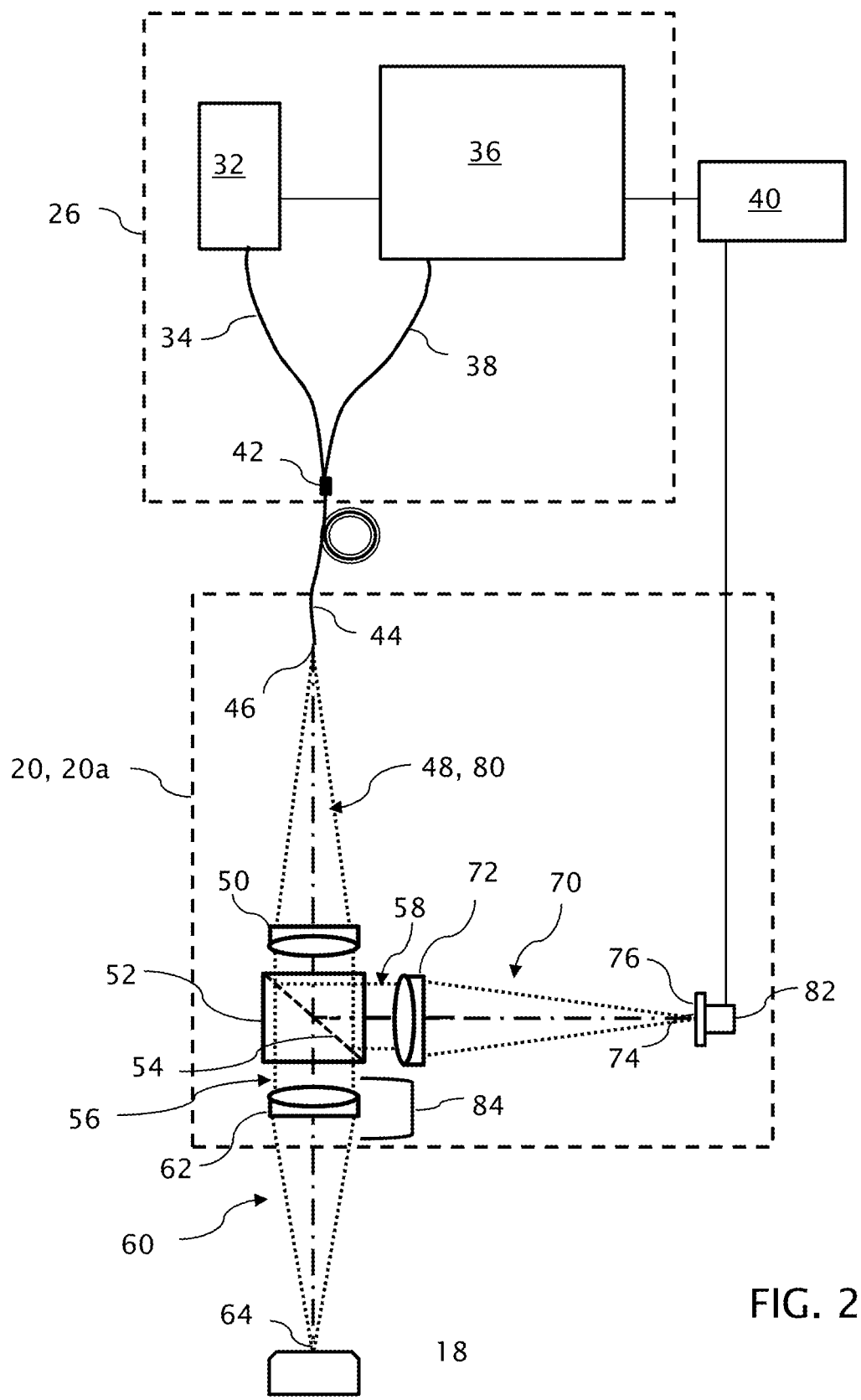

An optical arrangement for taking measurements of the test object 18 with an optical measurement system for the measuring machine 10 is shown in FIG. 2. A light source 32, such as a superluminescent diode, housed in a machine enclosure such as the slide support 26, provides for delivering high spatially coherent but low temporally coherent (i.e., light containing a range of wavelengths over a continuum of wavelengths) to the interferometer probe 20 typically through a single mode fiber 34, although it could be a polarizing fiber. Preferably within the same enclosure, such as the slide support 26, a detector 36 is arranged for receiving the light returning from the interferometer probe 20 though usually a single mode fiber 38, although it could be a polarizing fiber. A processor 40 for processing information from the detector 36 is preferably located outside the enclosure for communicating with a user interface (not shown).

A fiber coupler 42, which can be a 50%/50% coupler, connects the single mode fibers 34 and 38 to a common external polarizing fiber 44 for transmitting the high spatially coherent, low temporally coherent light to and from the interferometer probe 20. As schematically shown, the polarizing fiber 44 has extra length to accommodate motions of the interferometer probe 20 with respect to the slide support 26.

The polarizing fiber 44 is configured such that stress produced by bending the polarizing fiber 44 has an insignificant effect on the SNR and measurement accuracy of the probe 20. The polarizing fiber 44 reduces the throughput from the light source 32 to the probe 20 by approximately 50%, but the throughput may be increased by selecting a light source with greater radiant output. As such, a source beam 48 (shown in dotted lines) is linearly polarized instead of being unpolarized.

Figure 4:
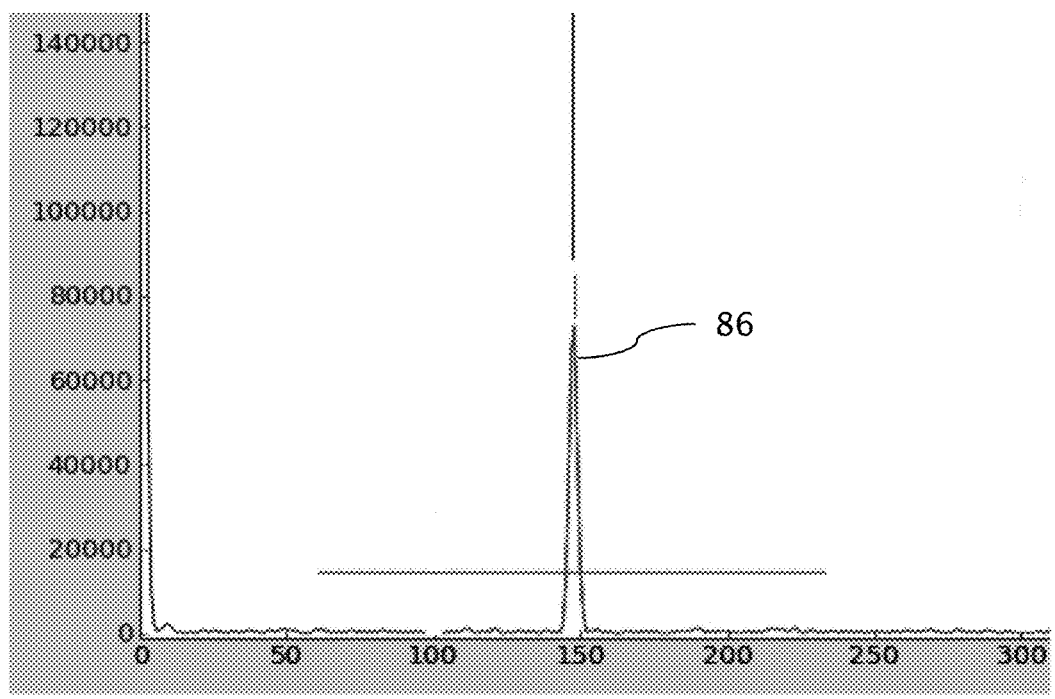

FIG. 4 illustrates a signal from a remote probe system where the abscissa is proportional to the distance between the test object 18 and the probe 20 and the ordinate is proportional to the signal strength. Movement of the probe 20 in the Z axis (away from the test object 18) will cause the peak of the signal to shift towards the right-hand direction. However, if a single mode fiber is used instead of the polarizing fiber 44 and the single mode fiber is bent strongly, a peak level of the signal will decrease and a small shift can occur of the peak level (approximately between 0 and 1.5 um). Using the polarizing fiber 44 of the measuring machine 10 reduces these effects to insignificant levels.

However, a "polarization preserving/maintaining" single mode fiber will not have the same benefits as the polarizing fiber 44 of the measuring machine 10. As shown in FIG. 12, multiple peaks arise due to the "polarization maintaining" single mode fiber distributing an unpolarized beam (e.g., from the light source 32 arriving through a single mode fiber) into orthogonal components and then propagating the orthogonal components (e.g., fast and slow) with different indexes of refraction along the fast and slow axis of the "polarization maintaining" single mode fiber. As such, fixed delays in the wavefront occur to the relatively unpolarized beam propagating from the light source 32 to the probe 20 and then back again through the external "polarization maintaining" single mode fiber to the detector 36.

The polarizing fiber 44 is a specialty optical fiber that propagates only one polarization direction without significant loss thus polarizing light that is propagated through the polarizing fiber 44. This form of single-polarization transmission carries several benefits over single mode or polarization-maintaining fibers. While polarization-maintaining fibers maintain the polarization direction that is aligned with the birefringence axis, cross talk can occur since the polarization-maintaining fiber is capable of guiding any polarization direction. Single mode fibers can be stressed to induce birefringence, which causes the single mode fiber to behave much like a wave plate. While the polarization axis can be manipulated in this case, the single mode fiber does not polarize the light.

In contrast, the polarizing fiber 44 only includes one polarization direction; all other directions are attenuated. As a result, the polarizing fiber 44 will polarize the light guided through it, creating excellent suppression of other polarization directions.

FIG. 13 illustrates the detected signal of the system in FIG. 2 that passes through a "polarization preserving/maintaining" single mode fiber when the object beam is blocked. If the object beam 60 is blocked so that it does not combine with reference beam 70, the reference beam 70 is returned to the detector of the measuring machine 10. The two peaks observed in FIG. 13 are caused by the "polarization preserving/maintaining" single mode fiber's breaking the unpolarized source beam 48 into orthogonal components and propagating them with different indexes of refraction; hence fixed delays are built into the beam propagating from the source 32 to the probe 20 and back through the "polarization preserving/maintaining" single mode fiber to the detector 36 of the measuring machine 10.

The following paragraphs demonstrate why the multiple peaks that are occurring in FIGS. 12 and 13 without attempting to determine strength, where OP=Optical Path Length: Intensity=$[(2Fast+2Slow)]^2$ for forward and back passes through the "polarizing maintaining" single mode fiber.

$$[(2Fast + 2Slow)]^2 = [e^{-i2\pi/\lambda[(2FastOP)]} + e^{-i2\pi/\lambda(2SlowOP)]}]$$

$$[e^{i2\pi/\lambda[(2FastOP)]} + e^{i2\pi/\lambda(2SlowOP)]}]$$

$$= \{2 + 2\cos[(2\pi/\lambda)(2FastOP - 2SlowOP)]\}$$

$$= 2\{1 + \cos(2\pi/\lambda)(2\delta)\}$$

Where: FastOP=Fast axis optical path for a single pass, SlowOP=Slow axis optical path for a single pass, and δ=(FastOP−SlowOP) through the "polarizing maintaining" single mode fiber-single pass.

The second highest peak to the right as shown in FIG. 13 is due to the above-described interference. If there is a small amount of depolarization in the probe 20 of the measuring machine 10, or crosstalk in the polarizing maintaining/preserving single mode fiber, a portion of the Fast axis can be converted to Slow and vice versa, thereby having the following additional interferences:

[(Fast out+Slow return)]$^2$
[(Slow out+Fast return)]$^2$

These interferences are approximately equal to $4\{1+\cos(2\pi/\lambda)(\delta)\}$, which cause the highest peak to the left as shown in FIG. 13. By adding in an object beam, additional combinations that contain the offset Δ (delta) of the object path versus a reference path that are fixed in a partial coherence interferometer, as shown in FIG. 12 and provided in the below table.

|         | SS-ref. | SF-ref. | FS-ref. | FF-ref. | SS-obj. | SF-obj. | FS-obj. | FF-obj. |
|---------|---------|---------|---------|---------|---------|---------|---------|---------|
| SS-ref. | none    | δ       | δ       | 2δ      | Δ       | Δ − δ   | Δ − δ   | Δ − 2δ  |
| SF-ref. | δ       | none    | none    | δ       | Δ + δ   | Δ       | Δ       | Δ − δ   |
| FS-ref. | δ       | none    | none    | δ       |         | Δ       | Δ       | Δ − δ   |
| FF-ref. | 2δ      | δ       | δ       | none    | Δ + 2δ  | Δ + δ   | Δ + δ   | Δ       |
| SS-obj. | Δ       | Δ + δ   | Δ + δ   | Δ + 2δ  | none    | δ       | δ       | 2δ      |
| SF-obj. | Δ − δ   | Δ       | Δ       | Δ + δ   | δ       | none    | none    | δ       |
| FS-obj. | Δ − δ   | Δ       | Δ       | Δ + δ   | δ       | none    | none    | δ       |
| FF-obj. | Δ − 2δ  | Δ − δ   | Δ − δ   | Δ       | 2δ      | δ       | δ       | none    |

Where:
S = Slow optical path in a "polarizing maintaining" single mode fiber-single pass.
F = Fast optical path in a "polarizing maintaining" single mode fiber-single pass.
SS = Slow optical path out and Slow optical path back in a "polarizing maintaining" single mode fiber.
SF = Slow optical path out and Fast optical path back in a "polarizing maintaining" single mode fiber.
FS = Fast optical path out and Slow optical path back in a "polarizing maintaining" single mode fiber.
FF = Fast optical path out and Fast optical path back in a "polarizing maintaining" single mode fiber.
ref. = reference path in an interferometer pen
obj. = object path in an interferometer pen Therefore, a "polarization preserving/maintaining" single mode fiber cannot provide the same benefits as the polarizing fiber 44 of the measuring machine 10 because of the additional peaks of interference in the signal caused by the inherent nature of the "polarization preserving/maintaining" single mode fiber.

Within the interferometer probe 20 having a probe body 20*a* schematically coincident with the representative dashed outline of the interferometer probe 20, the light is directed to a Linnik-type interferometer, although other interferometric arrangements could be used. In the arrangement shown, the light emitted from an end 46 of the polarizing fiber 44 as the source beam 48 (shown in dotted lines) is gathered and collimated by a collimator/condenser lens 50 in alignment with a non-polarizing beamsplitter 52. At a partially reflective surface 54 of the non-polarizing beamsplitter 52, the source beam 48 is divided into an object beam 56 (shown in dotted lines) that transmits through the partially reflective surface 54 and a reference beam 58 (shown in dotted lines) that is reflected by the partially reflective surface 54. The object beam 56 propagates along an object arm 60 through an object objective lens 62 within the probe body 20*a* to an object focus 64 proximate the test object 18 beyond the probe body 20*a*. The reference beam 58 propagates along a reference arm 70 through a reference objective lens 72 within the probe body 20*a* to a reference focus 74 proximate a reference reflector 76, which can be in the form of a plane mirror also within the probe body 20*a*. Preferably, all three lenses 50, 62, and 72 are achromatic, low dispersion lenses for matching focusing effects of the different wavelengths within the source, object, reference, and measurement beams 48, 56, 58, and 80.

Specular or diffuse reflections of the object beam 56 from the test object 18 are collected and re-collimated by the object objective lens 62 on route back to the beamsplitter 52. Similarly, reflections from the reference reflector 76 are collected and re-collimated by the reference objective lens 72 on route back to the beamsplitter 52. At the beamsplitter 52, at least a portion of the returning object beam 56 that transmits through the partially reflective surface 54 is recombined with at least a portion of the returning reference beam 58 that reflects from the partially reflective surface 54 into a common measurement beam 80 (shown overlaid with the source beam 48) on a return path to the collimator/condenser lens 50. Since the reflectivity of the test object 18 is generally less than the reflectivity of the reference reflector 76, the beamsplitter 52 is preferably arranged to more efficiently transmit light through the partially reflective surface 54 and to less efficiently reflect light from the partially reflective surface 54. The collimator/condenser lens 50 focuses the measurement beam 80 containing portions of the object and reference beams 56 and 58 back into the polarizing fiber 44 for transit to the detector 36. The end 46 of the polarizing fiber 44 receives the measurement beam 80 through the volume of an acceptance cone, which is related generally to the refractive indices of the fiber core and cladding.

Within the detector 36 arranged as a spectrometer, the measurement beam 80 can be re-collimated and reflected off a diffraction grating over a range of spectrally dispersed orientations, and the dispersed orientations of the measurement beam 80 can be focused along a linear array of photodiodes or charge-coupled devices (CCDs). Each different frequency (as a reciprocal of wavelength) from the object beam 56 portion of the measurement beam 80 interferes with the corresponding frequency of the reference beam 58 portion of the measurement beam 80 at a different focus position along the array. The intensity of the light focused along the array, representative of modulo $2\pi$ phase differences between the object and reference beam 56, 58 portions of the measurement beam 80, modulates at a detectable frequency, referred to as a modulation frequency that varies within a Nyquist interval (due to pixel sampling) proportional to the optical path length difference between the object and reference beam 56, 58 portions of the measurement beam 80. Since the intensity information is collected by a discrete number of pixels, the distinguishable frequencies generally range from zero up to one-half of the number of pixels involved in the measurement.

Figure 3A:
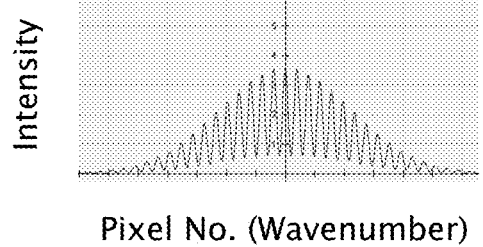
Figure 3B:
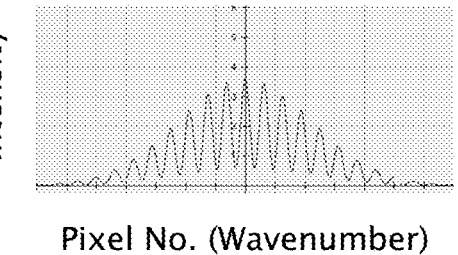

FIGS. 3A and 3B graph two different examples of intensity variations captured along the linear array pixels and along which the focus positions of the different frequencies (wavenumbers) are dispersed. The variation in intensity corresponding to variations in interference phase is substantially periodic at a measurable frequency, referred to as the modulation frequency. As optical path length differences between the object and reference beam 56, 58 portions of the measurement beam 80 increase from zero (i.e., the null position), the modulation frequency increases proportionally within the Nyquist interval of measurement. For example, the frequency of modulation depicted in FIG. 3A appears higher than the frequency of modulation depicted in FIG. 3B, evidencing a greater optical path length difference between the object and reference beam 56, 58 portions of the measurement beam 80 in the measurement captured by the detector 36 as shown in FIG. 3A versus the measurement of optical path length difference captured by the detector 36 as shown in FIG. 3B. FIG. 4 shows a calculated modulation frequency as a frequency spike 86 within the depicted range of measurement as may be graphically output from the processor 40.

Within the processor 40, the calculated modulation frequency can also be converted into a height on the surface of the test object 18. For gathering data over a range of points on the test object 18 within a common coordinate system, relative motions between the probe 20 and the test object 18 are monitored for tracing a position of the focus 64 of the probe 20 in space. During setup, the optical path length difference between the object and reference beams 56, 58 considered at the ideal focus position is set at a given modulation frequency. During measurement, departures from the given modulation frequency interpreted as surface height variations can be added to or subtracted from the measured relative position of the probe focus 64 to provide a finer measure of the position of a measured point on the test object 18 within the depth of focus of the objective lens 62.

Since departures from the given modulation frequency are also measures of departures from the ideal focus position, the departures from the given modulation frequency can also be used to maintain the focus within a usable range. In other words, the relative position of the probe 20 can be corrected by displacing the probe 20 along the Z axis to position the ideal focal point closer to the surface of the test object 18 and at a modulation frequency closer to the given modulation frequency. The focus corrections, in turn, maintain the probe within both the intended Nyquist interval of measurement and the focal depth of the objective lens 62.

The accuracy with which the modulation frequency can be determined is in part based on the contrast with which the interference phase modulation is expressed. Since intensity is related to the square of the amplitudes of the waveforms, the highest contrast of the interference phase modulations takes place when the relative intensities of the object and reference beam 56, 58 portions of the measurement beam 80 are equal. The intensity of the returning object beam 56 component of the measurement beam 80 depends upon the reflectivity of the test object 18 at the point of measurement, which can vary considerably between test objects or between different parts of the same test object.

To more closely balance the intensities of the reflected object beam 56 and the reflected reference beam 58, various embodiments provide for adjustably excluding a portion of the reference beam 58 over a progression of different size portions from being focused within the acceptance cone of the polarizing fiber 44. Different size portions of the reference beam 58 can be blocked or otherwise excluded from reaching the acceptance cone of the polarizing fiber 44 to adjust the intensity of the reference beam 58 in accordance with a nominal reflectivity from the test object 18.

For example, as shown in FIG. 2, the reference reflector 76 can be connected to an adjustable beam manipulator in the form of a linear adjuster 82, such as an adjustment-screw-driven mechanism, for displacing the reference reflector 76 along the optical axis of the objective lens 72 to variably defocus the objective lens 72. As a further part of the manipulator, a second linear adjuster 84, which can be in the form of threaded barrel, displaces the objective lens 62 by a related amount to compensate for the optical path length difference between the object arm 60 and the reference arm 70 associated with the translation of the reference reflector 76. The resulting displacement of the object focus 64 can be accommodated by recalibrating the object focus position with respect to the coordinate positions defined by the other machine axes. Alternatively, the objective lens 72 of the reference arm 70 could be similarly translated together with the reference reflector 76 to compensate for the optical path length difference imparted by the translation of the reference reflector 76. The combined translation of the objective lens 72 and reference reflector 76 obviates the need to recalibrate for changes in the position of the object focus 64. Instead of moving the reference reflector 76, the objective lens 72 could be similarly translated along its optical axis to variably defocus the reference beam 58 on the reference reflector 76 without changing the optical path length of the reference arm 70. For example, the objective lens 72 could be mounted in a threaded barrel as a part of a similar linear adjuster to more closely match the intensity of the returning reference beam 58 to a nominal intensity of the returning object beam 56.

Defocusing the objective lens 72 of the reference arm 70 introduces differential amounts of wavefront curvature into the reflected reference beam 58 which expands a focused volume of the measurement beam beyond the acceptance cone of the polarizing fiber 44. Increasing defocus excludes a larger portion of the reflected reference beam 58. The adjustment provides a simple and symmetric way of regulating the intensity of the reflected reference beam 58 for resisting destabilizing effects from disturbances such as thermal shifts. For determining a desired amount of defocus, interference contrast can be measured within the detector 36 by the overall measured intensity variation, and return object beam intensity 56, and adjustments to the amount of defocus can be made to better optimize the measured intensity variation.

Figure 5:
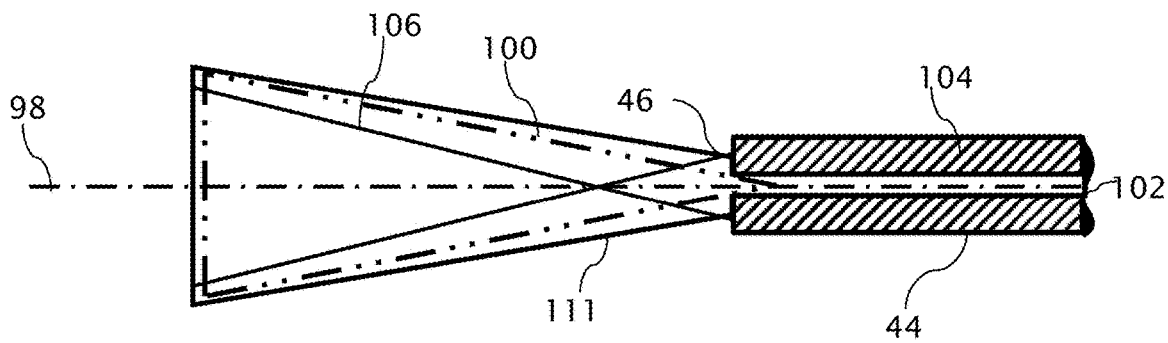
FIG. 5 depicts the effects of a beam manipulator in accordance with the arrangement of FIG. 2 in which a portion of the reference beam is expanded outside an acceptance cone of the polarizing fiber.

As shown in FIG. 5, when refocused by the collimator/condenser lens 72, the reference beam 58 portion of the measurement beam 80 contains a larger 111 or smaller 106 range of angles (depending on the direction of defocus) about the optical axis 98 and results in a larger spot size at the end 46 of the polarizing fiber 44 such that at least some of the converging elements of the reference beam 58 portion of the measurement beam 80 are oriented outside the acceptance cone of the polarizing fiber 44.

For example, as shown in FIG. 5, the volume of light capable of entering the polarizing fiber 44 is contained in the acceptance cone 100 shown in the phantom line. A cross section of the polarizing fiber 44 shows the core 102 of the polarizing fiber 44 exposed with a surrounding cladding 104. Another cone 106 shown in solid line represents the reference beam 58 portion of the measuring beam 80 subject to being defocused by the reference reflector 76 on a path converging before the end 46 of the polarizing fiber 44. While the cone 106 still converges in a symmetric fashion about the optical axis 98 of the collimator/condenser lens 50, the cone 106 has angular elements that are distributed outside the acceptance cone 100. As a result, the relative intensity of the reference beam 58 portion of the measuring beam 80 is reduced with respect to the object beam 56 portion of the measuring beam 80.

Figure 6:
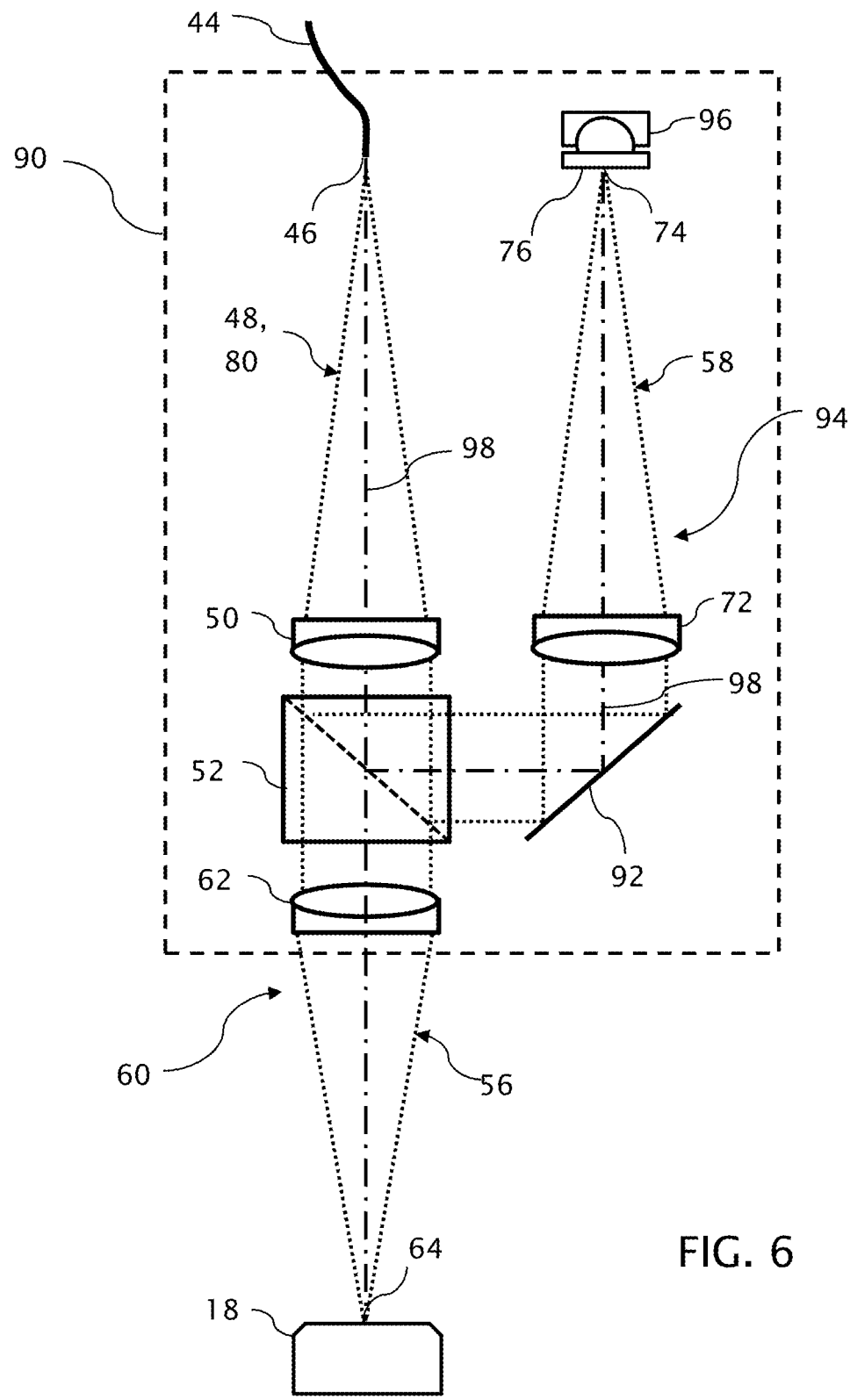
FIG. 6 is an enlarged diagram of alternative probe in which the reference arm is folded and a different type of beam manipulator is featured for more closely balancing intensities of object and reference beams directed to the detector.

FIG. 6 depicts an alternative interferometer probe 90 in a more compact configuration. Most of the components are the same and are referenced by the same numerals. However, a reflector 92, such as a plane mirror, is added to the reference arm 94 to fold the reference arm 94 into a more compact configuration. Although the reference reflector 76 could still be arranged for translation in the more compact configuration, the reference reflector 76 is shown in FIG. 6 mounted on a tilt adjuster 96 that pivots the reference reflector 76 about an axis passing through the reference focus 74. For example, the reference reflector 76 can be arranged in the form of a plane mirror that is tiltable about a fixed axis lying on the reflective surface of the mirror. The mirror can be supported, for example, on a gimbal, a semi-cylindrical bearing, or flexure joints and can be manually tilted, such as by a screw-type tilt adjuster or automatically tilted, such as by piezoelectric actuators.

Tilting the reference reflector 76 about the focal point 74 does not change the nominal optical path length of the reference arm 94 with respect to the optical path length of the object arm 60 or require any recalibration associated with a displacement of the object focus 64 position. The objective lens 72 re-collimates the tilted reflected reference beam 58 in a position that is laterally offset, e.g., no longer centered about the optical axis 98. When refocused by the collimator/condenser lens 50, the reference beam 58 portion of the measurement beam 80 contains an asymmetric distribution of angles about the optical axis 98 such that at least some of the angular elements of the reference beam 58 portion of the measurement beam 80 are removed from the acceptance cone of the polarizing fiber 44.

Figure 7:
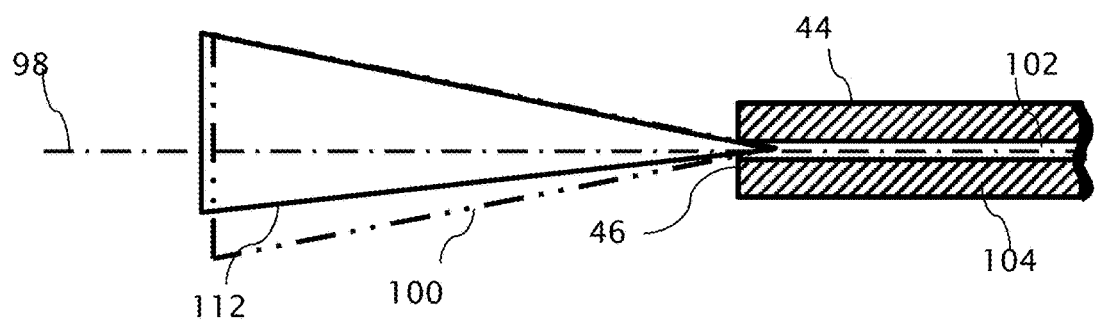
FIG. 7 depicts the effects of a beam manipulator in accordance with the arrangement of FIG. 6 in which a portion of the reference beam is excluded from the acceptance cone of the polarizing fiber.

For example, as shown in FIG. 7, a cone 112 shown in solid line (in contrast to the acceptance cone 100, which is shown in phantom line) represents the reference beam 58 portion of the measuring beam 80 subject to being tilted by the reference reflector 76 about the focus 74 on a path converging toward the end 46 of the polarizing fiber 44. While the cone 112 still converges toward the core 102 of the polarizing fiber 44 along the optical axis 98 of the collimator/condenser lens 50, the cone 112 has angular elements that are asymmetrically distributed around the optical axis 98. Thus, angular portions of 112 are removed that would have been accepted within cone 100 of the polarizing fiber 44. As a result, the relative intensity of the reference beam 58 portion of the measuring beam 80 is reduced with respect to the object beam 56 portion of the measuring beam 80.

The object beam 56 portion of the measuring beam 80 can be subject to similar exclusions based on the shape and diffusion characteristics of the test object 18, but the adjustable beam manipulator, such as the linear adjuster 82 or the tilt adjuster 96, can separately adjust the intensity of the reference beam 58 portion of the measurement beam 80 to more closely match the nominal intensity of the object beam 56 portion of the measuring beam 80.

While certain asymmetric or other diverted elements of the reference beam 58 would be physically excluded by the limited acceptance cone 100 of the polarizing fiber 44, the referenced exclusion can also take place in advance of the acceptance cone 100 by other limiting apertures of the optical components. For example, elements of the reference beam 58 can be tilted beyond the collection range of the objective lens 72 or vignetted in its collimated form by the collimator/condenser lens 50. In either case, the exclusion is associated with elements of the reference beam 58 that arrive beyond the acceptance cone 100 of the polarizing fiber 44.

Figure 8:
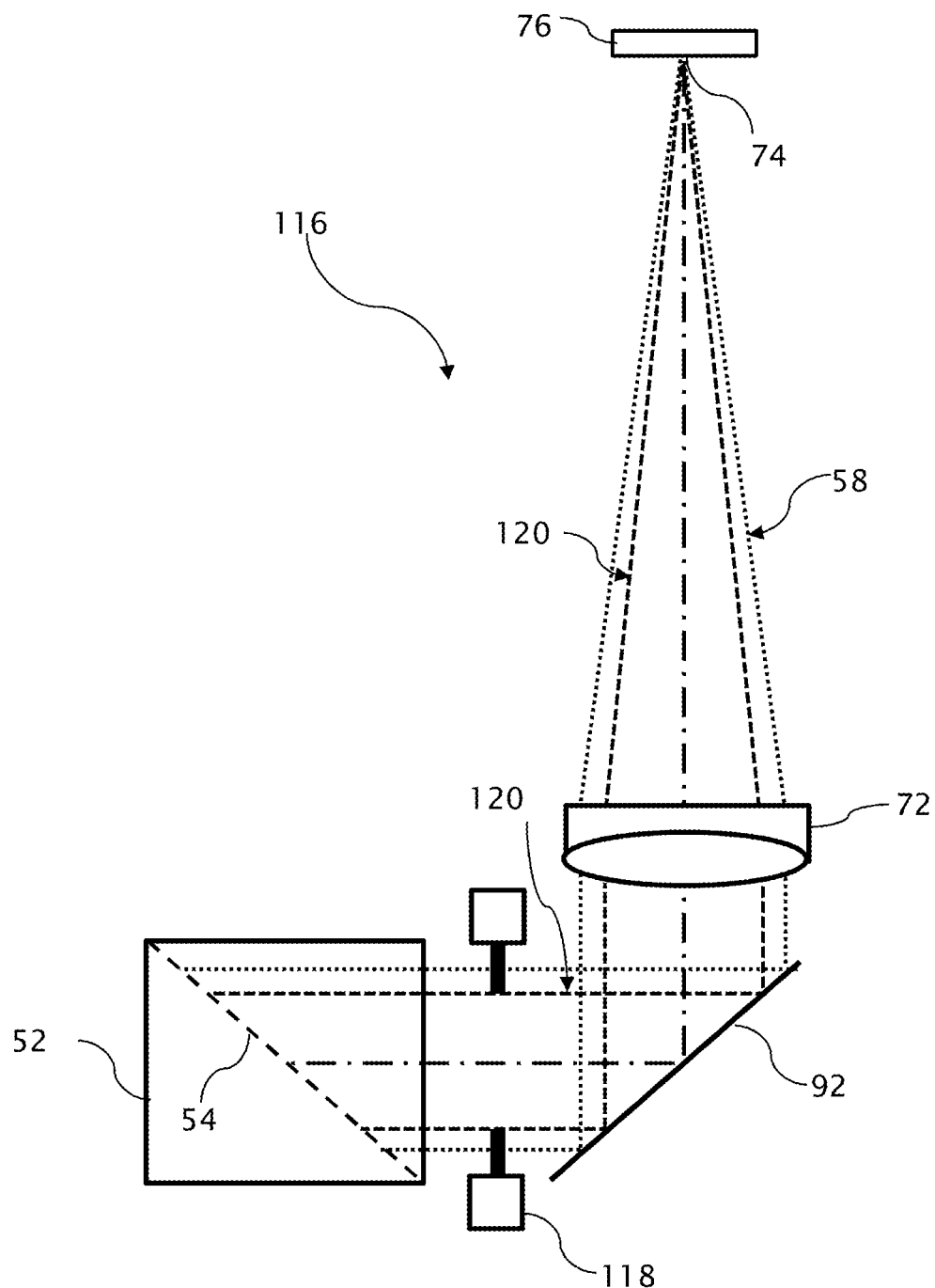
FIG. 8 is an enlarged diagram of an alternative reference arm containing another different type of beam manipulator.

Propagating elements of the reference beam 58 that would otherwise arrive within the acceptance cone 100 of the polarizing fiber 44 can also be excluded as shown and described, for example, in the embodiment of FIG. 8. FIG. 8 shows an enlarged reference arm 116 similar to the folded reference arm shown in FIG. 6 in which corresponding optical components share the same reference numerals. However, instead of linearly or angularly adjusting the reference reflector 76 for directing a portion of the volume of the reference beam 58 portion of the measurement beam 80 beyond the volume of the acceptance cone 100 of the polarizing fiber 44, the reference arm 116 includes an adjustable aperture stop 118, such as an adjustable iris, for blocking a portion of the reference beam 58 that would otherwise reach the acceptance cone 100 of the polarizing fiber 44. Here, a portion of the reference beam 58 is blocked from even reaching the reference reflector 76 and diffraction enlarges the spot size at the entrance 46 of the polarizing fiber 44. The surviving portion 120 of the reference beam 58 is shown in finely dashed line in comparison to the dotted-line depiction of the original reference beam 58. As described, for example, with respect to the tilt adjuster 96, the adjustable aperture stop 118 can be adjusted manually or automatically to intercept different size portions of the reference beam 58 over contiguous or non-contiguous areas. Since the same useful information, i.e., the phase of each wavelength, is contained in wavefronts extending across the reference beam 58, any portion of the reference beam 58, can be blocked for balancing its intensity with the intensity of the object beam 56 portion of the measuring beam 80 and thereby enhancing interference contrast.

Figure 9:
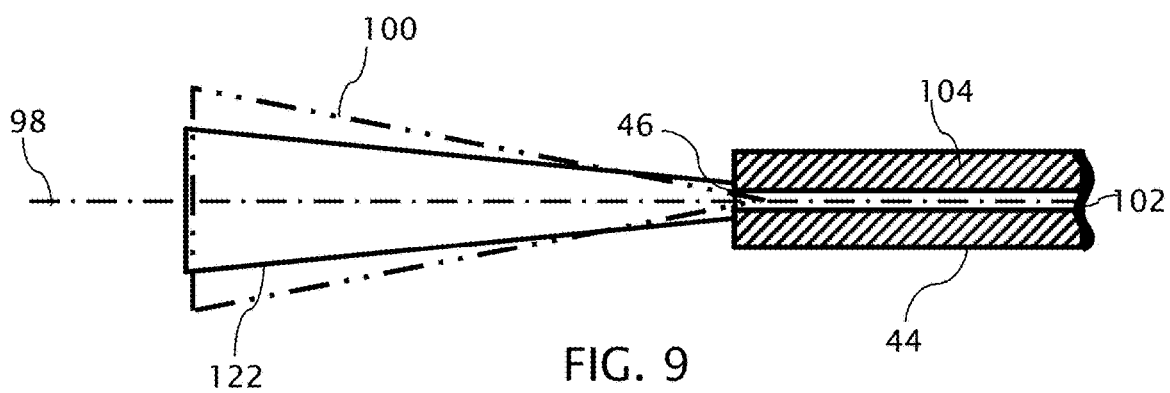
FIG. 9 depicts the effects of a beam manipulator in accordance with the arrangement of FIG. 8 in which a portion of the reference beam is intercepted and diffracted from reaching the acceptance cone of the polarizing fiber.

As shown in FIG. 9, instead of filling the acceptance cone 100 of the polarizing fiber 44 at the size originally emitted from the polarizing fiber 44, the surviving reference beam 120 portion of the measuring beam 80 as cropped by the adjustable aperture stop 118 converges in the form of a cone 122 that underfills the acceptance cone 100 of the polarizing fiber 44 and diffracts to a larger spot at 46. Thus, a portion of the original reference beam 58 portion of the measurement beam 80 that would otherwise fit within the acceptance cone 100 of the polarizing fiber 44 is lost. The aperture size controlled by the adjustable aperture stop 118 can be adjusted for relatively adjusting the intensity of the reference beam 58 portion of the measurement beam 80 that enters the polarizing fiber 44.

Instead of blocking and diffracting light by radially reducing aperture size, any one or more portions of the transverse area of the reference beam 58 can be blocked. For example, the adjustable aperture stop 118 could be constructed in the form of a louver in which one or more vanes are angularly displaced for blocking more or less light. In addition, portions of the reference beam 58 over a progression of different size portions can be excluded from being focused within the acceptance cone 100 of the polarizing fiber 44 by various combinations of blocking and diffracting portions of the reference beam 58 that would otherwise reach the acceptance cone 100 or by directing portions of the reference beam 58 beyond the acceptance cone 100. Assuming that the intensity of the reference beam 58 portion of the measuring beam is initially matched with a given intensity of the object beam 56 portion of the reference beam 80, the relative intensity of the reflected object beam 56 can be monitored during the course of measurement to determine whether more or less defocus, tilt or an increased or decreased aperture size is required to rebalance the intensities of the object beam and reference beam 56 and 58 portions of the measurement beam 80.

Figure 10:
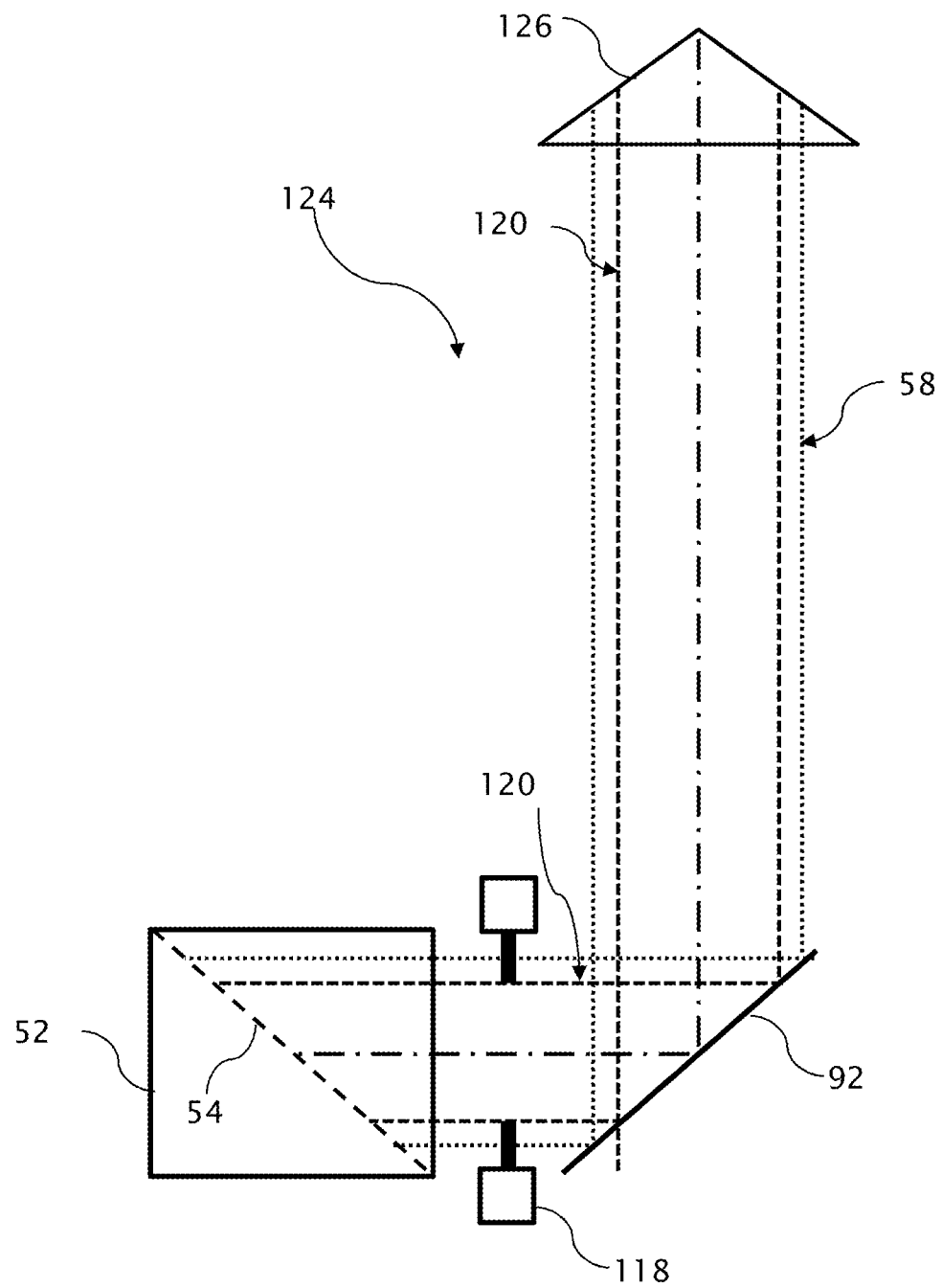
FIG. 10 is an enlarged diagram of an alternative reference arm simplified for use with the beam manipulator of FIG. 8.

FIG. 10 shows an enlarged reference arm 124 similar to the folded reference arm 116 shown in FIG. 8 for use in the interferometer probe 20 in which corresponding optical components share the same reference numerals. In contrast to the reference arm 116 of FIG. 8, the reference arm 124 does not include a reference objective for focusing the reference beam 58. Instead, the reference reflector 126, shown in the form of a retroreflector, such as a corner cube, retroreflects the collimated reference beam 58. However, similar to the embodiment of FIG. 8, the adjustable aperture stop 118 provides for similarly blocking and diffracting a portion of the reference beam 58 that would otherwise reach the acceptance cone 100 of the polarizing fiber 44.

The embodiment of FIG. 10 eliminates an objective lens and does not require readjusting the relative optical path lengths of the object and reference arms 60, 124 or recalibrating for a displaced object focus 64. Although shown between the beamsplitter 52 and the reflector 92, the adjustable aperture stop 118 can be positioned anywhere along the reference arm 124 including at or near the reference reflector 126 and can be arranged to block and diffract any one or more portions of the reference beam 58.

The light source 32 for powering the optical profilometer can be a superluminescent diode for generating light over a continuum of wavelengths, which are typically within the infrared spectrum. Preferably, the gain ripple over the working spectrum is low and the bandwidth is matched together with the operating bandwidth of the detector 36. A disadvantage of using light within the infrared spectrum is that the light is invisible, and therefore, does not produce a visible focus spot on the test object 18, which can be useful during setup and use to allow an operator see where the measurement is being made and if the measured point is in focus.

Figure 11:
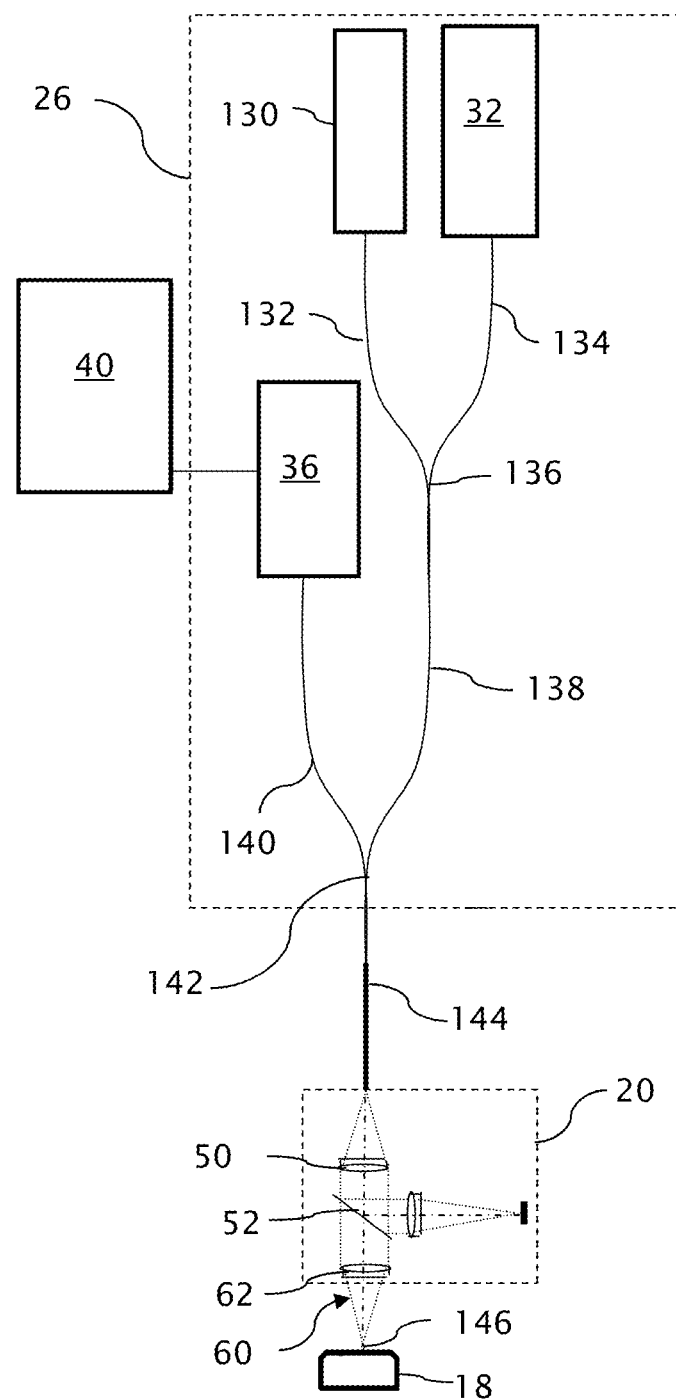
FIG. 11 is a diagram of a similar optical measurement system in which a visible light source is incorporated into the system for illuminating a focus spot on the test object.

FIG. 11 shows a similar optical measurement system in which a visible light source 130, such as a conventional laser diode, is optically coupled with an invisible light source of the measurement system, which invisible light source still designated with the reference numeral 32 for better comparison with other embodiments. Light output from the visible light source 130 as conveyed by a single mode fiber 132 is combined with light output from the invisible light source 32 as conveyed by a single mode fiber 134 at a fiber coupler 136 and is further propagated together along a single mode fiber 138. The fiber coupler 136 can be arranged to compensate for power differences between the two sources, particularly for preserving more of the invisible light intended for measurement and for conveying only the amount of visible light needed to produce the desired visible focus spot. For example, the fiber coupler 136 may be arranged as a wavelength division multiplex coupler. Thereafter, the combined visible and invisible light conveyed along the single mode fiber 138 through a fiber coupling 142 to a polarizing fiber 144, which corresponds to the polarizing fiber 44 for conveying light to and from the interferometer probe 20. The fiber coupler 142 also couples the polarizing fiber 144 to a single mode fiber 140 for conveying light from the interferometer probe 20 to the detector 36. The single mode fibers 132, 134, 138, and 140 also may be polarizing fibers.

Within the interferometer probe 20, the visible light follows a path of transmission resulting in the creation of a visible focus spot 146 on the test object 18. That is, the visible light from the visible light source 130 is transmitted along the polarizing fiber 144 through the collimating/condenser lens 50 to the beamsplitter 52 and is directed from the beamsplitter 52 along the object arm 60 through the objective lens 62 to form the visible focus spot 146.

Instead of generating an instantaneous bandwidth, the light source 32 can establish a similar bandwidth by generating a succession of different wavelengths over the intended bandwidth. With a single interference phase generated by each wavelength for a given measured point on the test object 18, the detector 36 can be simplified, such as in the form of a simple photodetector.

Those of skill in the art will appreciate that the referenced acceptance cones and converging beam cones are idealized forms and the actual dimensions of the polarizing fiber end and the wave nature of the light itself render the cones as approximations of the overall light interactions discussed. In addition, those of skill in the art will appreciate that alternatives, variations, modifications, additions, and different combinations of the elements disclosed in the example embodiments may be made in accordance with the overall teaching of the invention and which are intended to be encompassed by the following claims.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination.

The present disclosure contemplates that many changes and modifications may be made. Therefore, while forms of the improvements have been shown and described, and a number of alternatives discussed, persons skilled in this art will readily appreciate that various additional changes and modifications may be made without departing from the scope of the invention, as defined and differentiated by the following claims.

The invention claimed is:

1. A method of enhancing interference contrast in an optical measurement system having an interferometer probe connected to both a light source and a detector by an external polarizing fiber, the method comprising:
   directing a collimated source beam having an instantaneous or sequentially established bandwidth spanning a range of wavelengths to a beamsplitter within the interferometer probe;
   dividing the collimated source beam at the beamsplitter into:
      an object beam that is directed along an object arm through an object objective within the interferometer probe to an object focus proximate a test object, and
      a reference beam that is directed along a reference arm to a reference reflector within the interferometer probe;
   angularly redistributing the reference beam along the reference arm;
   combining the object beam reflected from the test object with the angularly redistributed reference beam reflected from the reference reflector at the beamsplitter into a measurement beam; and
   focusing the measurement beam toward an end of a polarizing fiber having an acceptance cone that limits angular distributions of the measurement beam that are accepted for further propagation along the polarizing fiber toward the detector;
   wherein the angularly redistributing of the reference beam includes adjusting the angular redistributions of the reference beam to limit the reference beam portion of the focused measurement beam that is accepted through the acceptance cone of the polarizing fiber for further propagation toward the detector.

2. The method of claim 1, further comprising:
   comparing respective intensities of the reflected object beam and the reflected reference beam within the measurement beam; and
   limiting the reference beam portion of the measuring beam that is accepted through the acceptance cone of the polarizing fiber to more closely balance the intensities of the reflected object beam portion and the reference beam portion of the measurement beam propagating along the polarizing fiber.

3. The method of claim 2, wherein the excluded portion includes noncontiguous portions of the reference beam.

4. The method of claim 2, wherein the comparing includes measuring contrast among phase modulations of different wavelengths in the detector.

5. The method of claim 1, wherein the dividing includes directing the reference beam along the referene arm through a reference objective within the interferometer probe to a reference focus proximate the reference reflector.

6. The method of claim 5, wherein the angularly redistributing of the reference beam inludes defocusing the reference beam on the reference reflector.

7. The method of claim 6, wherein the reference beam is defocused by translating the reference reflector with respect to the reference objective along a common optical axis together with an optical path length adjustment to maintain a relative optical path length between the reference arm and the object arm.

8. The method of claim 7, wherein the optical path length adjustment is affected by relatively translating the object objective with respect to the beamsplitter.

9. The method of claim 5, wherein the angularly redistributing of the reference beam includes pivoting the reference reflector about an axis passing through the reference focus.

10. The method of claim 1, further comprising transmitting the source beam from a light source along the polarizing fiber to a collimating lens for directing the collimated source beam to the beamsplitter within the interferometer probe.

11. The method of claim 10, wherein the light source is a first light source for emitting invisible light and further comprising:
    transmitting visible light from a second light source along the polarizing fiber through the collimating lens to the beamsplitter; and directing the visible light from the beamsplitter along the object arm through the object objective to a focus spot visible on the test object.

12. A probe for an optical measurement system comprising:
- a probe body arranged to be adjustably mounted in a measuring machine for optically measuring a test object;
- at least one polarizing fiber optically coupled within the probe body for transmitting a source beam having an instantaneous or sequentially established bandwidth spanning a range of wavelengths to the probe body and for transmitting a measurement beam from the probe body toward a detector;
- at least one collimator, a beamsplitter, an object objective, a reference lens, and reflector mounted within the probe body;
- the at least one collimator being arranged for collimating the source beam emitted from the at least one polarizing fiber;
- the beamsplitter being arranged for dividing the collimated source beam into both an object beam that is directed along an object arm through the object objective to an object focus proximate the test object and a reference beam that is directed along a reference arm to the reference reflector;
- an adjustable beam manipulator for angularly redistributing the reference beam along the reference arm;
- the beamsplitter also being arranged for combining the object beam reflected from the test object with the angularly redistributed reference beam reflected from the reference reflector into the measurement beam;
- the at least one collimator being arranged for focusing the measurement beam toward the at least one polarizing fiber having an acceptance cone of the at least one polarizing fiber that limits angular distributions of the measurement beam that are accepted for further propagation along the polarizing fiber toward a detector; and
- the adjustable beam manipulator being arranged for adjusting the angular redistributions of the reference beam to limit the reference beam portion of the focused measurement beam that is accepted through the acceptance cone of the polarizing fiber for further propagation toward the detector.

13. The probe of claim 12, wherein a reference objective is also mounted in the probe body and the reference beam is directed along the reference arm through the reference objective to a reference focus proximate the reference reflector.

14. The probe of claim 13, wherein the adjustable beam manipulator provides for variously defocusing the reference beam on the reference reflector.

15. The probe of claim 14, wherein the adjustable beam manipulator includes a first linear adjuster for translating the reference reflector with respect to the reference objective along a common optical axis and a second linear adjuster for relatively adjusting relative optical path length between the reference arm and the object arm to compensate for a change in optical path length associated with the translation of the reference reflector.

16. The probe of claim 13, wherein the adjustable beam manipulator includes a tilt adjuster for pivoting the reference reflector about an axis passing through the reference focus.

17. The probe of claim 16, wherein the at least one polarizing fiber that is optically coupled within the probe body is a single fiber that provides for both transmitting the source beam to the probe body and transmitting the measurement beam from the probe body.

18. The probe of claim 16, wherein each of the excluded portions includes noncontiguous portions of the reference beam.

* * * * *